US008885370B2

(12) United States Patent
Takegami

(10) Patent No.: US 8,885,370 B2
(45) Date of Patent: Nov. 11, 2014

(54) CURRENT-FED ISOLATION CONVERTER

(75) Inventor: Eiji Takegami, Tokyo (JP)

(73) Assignee: TDK Corporation (JP)

( * ) Notice: Subject to any disclaimer, the term of this patent is extended or adjusted under 35 U.S.C. 154(b) by 148 days.

(21) Appl. No.: 13/559,079

(22) Filed: Jul. 26, 2012

(65) Prior Publication Data

US 2013/0027984 A1  Jan. 31, 2013

(30) Foreign Application Priority Data

Jul. 29, 2011  (JP) ................ 2011-166313

(51) Int. Cl.
*H02H 7/122* (2006.01)
*H02M 3/335* (2006.01)
*H02M 1/34* (2007.01)
*H02M 3/337* (2006.01)

(52) U.S. Cl.
CPC ............... *H02M 1/34* (2013.01); *H02M 3/335* (2013.01); *H02M 3/3374* (2013.01)
USPC ...................................... 363/56.06

(58) Field of Classification Search
USPC ........ 363/15, 16, 17, 20, 21.01, 21.04, 21.05, 363/21.1, 21.11, 21.12, 21.13, 21.18, 22, 363/24, 25, 26, 56.01, 56.02, 56.03, 56.05, 363/56.06, 56.07, 56.08; 323/222, 223, 323/225, 285
See application file for complete search history.

(56) References Cited

U.S. PATENT DOCUMENTS

| 6,452,815 B1* | 9/2002 | Zhu et al. ............... 363/17 |
| 2008/0278130 A1* | 11/2008 | Ito .................... 323/282 |
| 2012/0139522 A1* | 6/2012 | Hasegawa et al. ........... 323/311 |

FOREIGN PATENT DOCUMENTS

| JP | 62-203559 | 9/1987 |
| JP | 2001-054279 | 2/2001 |
| JP | 2001-054279 A | 2/2001 |
| JP | 2009-050080 A | 3/2009 |
| JP | 2009-055747 A | 3/2009 |

OTHER PUBLICATIONS

Japanese Office Action for Application No. 2011-166313 dated Jun. 18, 2013, pp. 1-2. (With Translation).

\* cited by examiner

*Primary Examiner* — Gary L Laxton
*Assistant Examiner* — Alex Torres-Rivera
(74) *Attorney, Agent, or Firm* — Harness, Dickey & Pierce, P.L.C.

(57) ABSTRACT

A current-fed isolation converter includes a coil that is connected to a primary side of a transformer, a power source that supplies electric power to the primary side of the transformer, a switching element that controls a first electric current flowing in the coil, a snubber circuit that includes a rectifying element and a capacitive element that is charged by a second electric current flowing in the rectifying element, and a step-down power supply circuit that regenerates electric charge of the capacitive element to the power source. The snubber circuit controls an excess voltage that is generated when the switching element is turned off. The power supply circuit maintains a charging voltage of the capacitive element at a predetermined voltage value.

14 Claims, 5 Drawing Sheets

CURRENT-FED ISOLATION CONVERTER

CROSS-REFERENCE TO RELATED APPLICATION

This application claims priority to Japanese Patent Application No. 2011-166313 filed Jul. 29, 2011 which is hereby expressly incorporated by reference herein in its entirety.

BACKGROUND

The present invention relates to a current-fed isolation converter. Specifically, the current-fed isolation converter has a snubber circuit that regenerates energy stored in a snubber capacitor to an input level.

Japanese Patent Publication No. S62-203559 discloses a current-fed isolation converter. In the disclosed current-fed isolation converter, an excess voltage is applied to a switching element when the switching element is turned off. A snubber circuit is generally used to prevent the excess voltage from being applied to the switching element. However, when a conventional RCD snubber circuit, which is configured with a resistor (R), a capacitor (C), and a diode (D), is used, the efficiency of the convertor decreases. Thus, heat generation increases. In order to solve the above problems, Japanese Patent Publication No. 2001-54279 discloses a different type of snubber circuit. This snubber circuit regenerates energy stored at a snubber capacitor to an input level.

The snubber circuit disclosed in JP2001-54279 regenerates electric charge, which is stored in the snubber capacitor when the switching element is turned off, to a power source. The regeneration is performed by resonance of the snubber capacitor and a reactor. Thus, it is hard to set constant values for the circuit elements (the snubber capacitor and the reactor). In consideration of variations of the characteristics of the circuit elements, it is also hard to design the snubber circuit to stably perform.

An object of the present invention is to provide a current-fed isolation converter including a regeneration-type snubber circuit that stably performs and that has a simple circuit configuration or is implemented in a variety of ways.

SUMMARY

A current-fed isolation converter according to the present invention includes a coil that is connected to a primary side of a transformer, a power source that supplies electric power to the primary side of the transformer, a switching element that controls a first electric current flowing in the coil, a snubber circuit that includes a rectifying element and a capacitive element, the capacitive element being charged by a second electric current flowing in the rectifying device, and a step-down power supply circuit that regenerates electric charge of the capacitive element to the power source. The snubber circuit controls an excess voltage that is generated when the switching element is turned off. The power supply circuit maintains a charging voltage of the capacitive element as a predetermined voltage value.

In the current-fed isolation converter, it is preferred that the predetermined voltage value Vx satisfies the following equation:

$$Vy \leq Vx \leq Vz$$

Here, Vy is a first voltage value applied to both terminals of the switching element when the switching element is turned off, and a surge voltage is removed from the first voltage value. Vz is a second voltage value that corresponds to a maximum rated voltage between both terminals of the switching element.

In the current-fed isolation converter, it is preferred that when the switching element stops a switching operation, the power supply circuit decreases the charging voltage of the capacitive element approximately to an output voltage of the power source.

In the current-fed isolation converter, it is preferred that when the current-fed isolation converter is used as a bidirectional converter that transmits electric power between the primary side and a secondary side of the transformer in both directions, the switching element performs as a circuit element of a rectifying circuit and that when the switching element performs as the circuit element of the rectifying circuit, the power supply circuit maintains the charging voltage of the capacitive element at the predetermined voltage value.

According to the present invention, a current-fed isolation converter including a regeneration-type snubber circuit, which stably performs and which has a simple circuit configuration or is implemented in a variety of ways, can be provided. The snubber circuit does not perform by resonance. Thus, even though circuit elements that configure the snubber circuit have variations of constant values, the snubber circuit stably performs.

In this snubber circuit, a charging voltage of a capacitive element is maintained as a predetermined voltage value (lower than a surge voltage). The capacitive element is charged during an occurrence of an instant surge voltage when a switching element is turned off. As a result, the snubber circuit can effectively control a voltage applied to both terminals of the switching element.

When the switching element stops a switching operation, a power supply circuit decreases the charging voltage of the capacitive element approximately to an output voltage of a power source. Thus, the rise of the voltage applied to both terminals of the switching element can be surely prevented.

Further, when electric power is transmitted between a primary side and a secondary side of a transformer in both directions, a stable voltage potential level between a source and a drain of the switching element can be maintained.

DESCRIPTION OF EXEMPLARY EMBODIMENTS

Embodiments of a current-fed isolation converter having a snubber circuit according to the present invention will be explained below with reference to the drawings. In the following embodiments, a DC-DC converter is explained as an example of the current-fed isolation converter.

Figure 1:
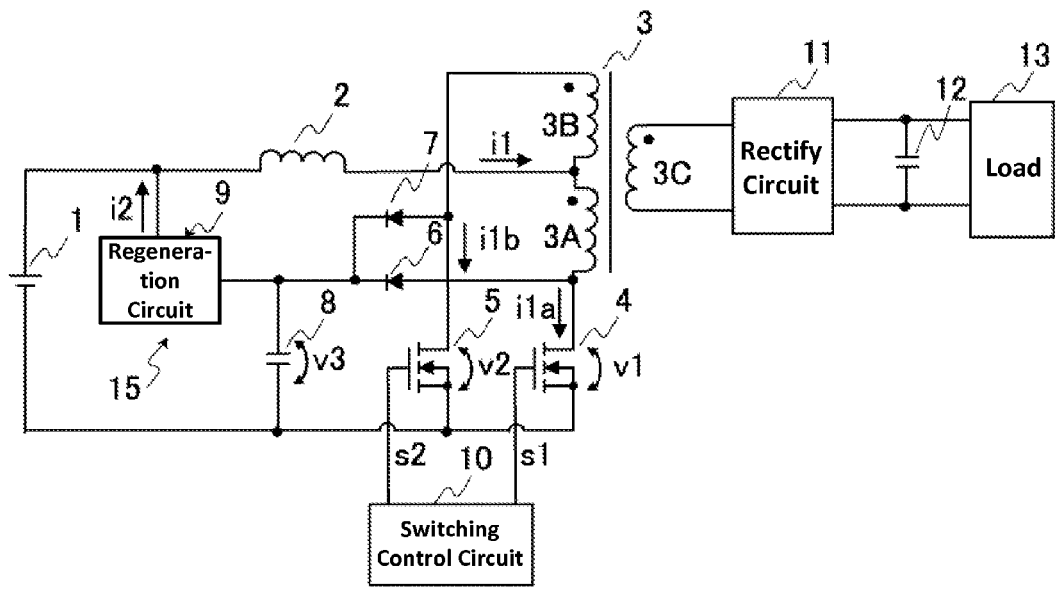
FIG. 1 is a circuit diagram of a current-fed isolation converter according to an embodiment of the present invention.

FIG. 1 is a circuit diagram of a DC-DC converter having a snubber circuit according to an embodiment of the present invention. The DC-DC converter is a current-fed isolation converter with a choke coil 2. The DC-DC converter is configured with a transformer 3, a primary side circuit provided at a primary side of the transformer 3, and a secondary side circuit provided at a secondary side of the transformer 3. The transformer 3 includes a primary winding 3A, a primary winding 3B, and a secondary winding 3C. The primary side circuit is configured with the choke coil 2, a field effect transistor (FET) 4, an FET 5, a switching control circuit 10, and a snubber circuit 15. The snubber circuit 15 is configured with a diode 6, a diode 7, a capacitor 8, and a regeneration circuit 9. The secondary side circuit is configured with a rectifying circuit 11 and a capacitor 12. A load 13 is connected to an output terminal of the secondary side circuit.

Figure 2:
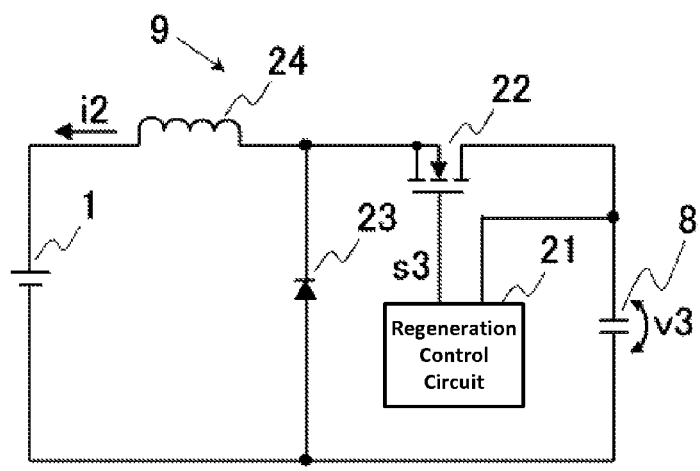
FIG. 2 is a schematic circuit diagram of a regeneration circuit shown in FIG. 1.

FIG. 2 shows an example of the regeneration circuit 9 shown in FIG. 1 that is configured with a step-down chopper circuit. The step-down chopper circuit is configured with a regeneration control circuit 21, an FET 22, a diode 23, and a choke coil 24.

As shown in FIG. 1, one terminal (dotted terminal) of the primary winding 3A and one terminal (non-dotted terminal) of the primary winding 3B are connected to each other at a node. Then, one terminal of the choke coil 2 is connected to this node. Another terminal of the choke coil 2 is connected to a positive electrode of a DC power source 1. Another terminal (non-dotted terminal) of the primary winding 3A is connected to a ground potential (negative electrode) of the DC power source 1 through the FET 4. Another terminal (dotted terminal) of the primary winding 3B is connected to the ground potential of the DC power source 1 through the FET 5. Because the above elements are connected as discussed above, an electric current "i1" flowing in the choke coil 2 is divided into an electric current flowing in the primary winding 3A and an electric current flowing in the primary winding 3B at the transformer 3. Further, another terminal (non-dotted terminal) of the primary winding 3A is connected to the capacitor 8 through the diode 6. Similarly, another terminal (dotted terminal) of the primary winding 3B is connected to the capacitor 8 through the diode 7. As a result, the electric current flowing in the primary winding 3A is either of an electric current flowing in the FET 4 and an electric current flowing in the diode 6. Similarly, the electric current flowing in the primary winding 3B is either of an electric current flowing in the FET 5 and an electric current flowing in the diode 7.

The switching control circuit 10 supplies a driving signal "s1" to a gate of the FET 4 and supplies a driving signal "s2" to a gate of the FET 5. The switching control circuit 10 controls a switching operation of the FETs 4 and 5 such that at least one of the FETs 4 and 5 is turned on. When both the FETs 4 and 5 are tuned on, the electric current "i1" flowing in the choke coil 2 increases. On the other hand, only one of the FETs 4 and 5 is turned on, the electric current "i1" decreases. When the FET 4 is turned off, an electric current for charging flows in the diode 6, thereby, the capacitor 8 is charged. As a result, an excess voltage applied between a source and a drain of the FET 4 is controlled and suppressed. Similarly, when the FET 5 is turned off, an electric current for charging flows in the diode 7, thereby, the capacitor 8 is charged. As a result, an excess voltage applied between a source and a drain of the FET 5 is controlled and suppressed.

The regeneration circuit 9 regenerates the electric charge of the capacitor 8 to the DC power source 1. The regeneration circuit 9 is configured with the step-down chopper circuit as shown in FIG. 2. In the regeneration circuit 9, the regeneration control circuit 21 controls a switching operation of the FET 22. The regeneration control circuit 21 supplies a driving signal "s3" to a gate of the FET 22. The regeneration control circuit 21 performs pulse width modulation (PWM) control to maintain a voltage value of the capacitor 8 as a predetermined value by detecting a charging voltage of the capacitor 8. In the regeneration circuit 9, when the FET 22 is turned on, the diode 23 is turned off. When the FET 22 is turned off, the diode 23 is turned on. When the FET 22 is turned on, the electric charge stored in the capacitor 8 is discharged. After an electric current generated by the discharged electric charge flows in the choke coil 24, it becomes a regeneration current "i2." The regeneration current "i2" flows toward the DC power source 1. When the diode 23 is turned on, an electric current generated by energy stored in the choke coil 24 flows toward the DC power source 1 as the regeneration current "i2."

Figure 3:
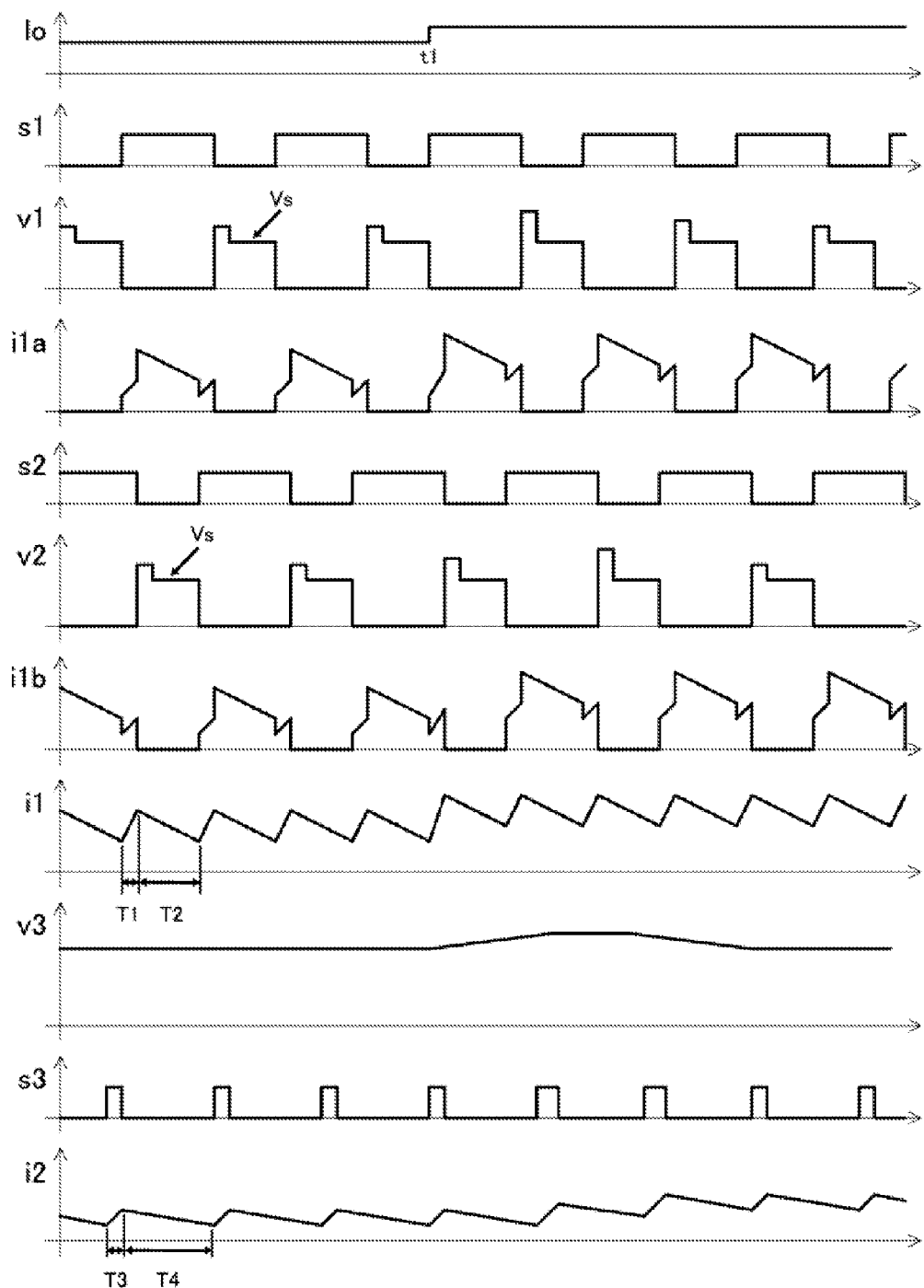
FIG. 3 is a waveform diagram of a voltage and an electric current when a current-fed isolation converter according to an embodiment of the invention is in a normal operation.

FIG. 3 is a waveform diagram of voltages and electric currents of each part of the current-fed isolation converter shown in FIG. 1. FIG. 3 is the waveform diagram of a voltage and an electric current when the current-fed isolation converter according to an embodiment is in a normal operation. In FIG. 3, an output electric current "Io" supplied to the load 13 increases at time "t1." "s1" is a voltage value corresponding to the driving signal "s1" applied to the gate of the FET 4. "s2" is a voltage value corresponding to the driving signal "s2" applied to the gate of the FET 5. The FET 4 is turned on when "s1" is in a high-level. The FET 4 is turned off when "s1" is in a low-level. The FET 5 is turned on when "s2" is in a high-level. The FET 5 is turned off when "s2" is in a low-level. "v1" is a voltage between a source and a drain of the FET 4. "i1a" is an electric current flowing in the FET 4. "v2" is a voltage between a source and a drain of the FET 5. "i1b" is an electric current flowing in the FET 5. Immediately after the FET 4 is turned off, the voltage between the source and the drain of the FET 4 increases. However, this voltage rise is suppressed because the electric current for charging flows in the capacitor 8 through the diode 6. At the same time, immediately after the FET 5 is turned off, the voltage between the source and the drain of the FET 5 increases. However, this voltage rise is suppressed because the electric current for charging flows in the capacitor 8 through the diode 7. "i1" is the electric current flowing in the choke coil 2. The electric current "i1" increases during a term "T1" in which both the FET 4 and the FET 5 are turned on. On the other hand, the electric current "i1" decreases during a term "T2" in which only one of the FET 4 and the FET 5 is turned on. "v3" is a charging voltage of the capacitor 8. "s3" is a voltage value corresponding to the driving signal "s3" applied to the gate of the FET 22. "i2" is the regeneration current flowing from the step-down chopper circuit toward the DC power source 1. The FET 22 is turned on when "s3" is in a high-level. The FET 22 is turned off when "s3" is in a low-level. The regeneration current "i2" increases during a term "T3" in which the FET 22 is turned on. On the other hand, the regeneration current "i2" decreases during a term "T4" in which the FET 22 is turned off.

An output voltage in a square wave is generated at the secondary side of the transformer 3 during the term "T2" in which only one of the FET 4 and FET 5 is turned on. After this output voltage is rectified by the rectifying circuit 11 and is then smoothed by the capacitor 12, the output voltage is supplied to the load 13.

When the output electric current "Io" increases at time t1, the term T2 in which both the FET 4 and the FET 5 are turned on increases. As a result, a mean electric current of the electric current "i1" flowing in the choke coil 2 increases. Because the mean electric current increases, the electric current for charging of the capacitor 8 increases so that the charging voltage "v3" of the capacitor 8 increases. The regeneration control circuit 21 controls a switching operation of the FET 22 so as to adjust the charging voltage "v3" of the capacitor 8 to a predetermined voltage value "Vc." Therefore, when the charging voltage "v3" of the capacitor 8 increases, a duty ratio of the driving signal "s3" that is applied to the gate of the FET 22 increases by the regeneration control circuit 21 in order to suppress the rise of the charging voltage "v3." As a result, because a turning-on period of the FET 22 becomes longer, the rise of the charging voltage "v3" of the capacitor 8 is suppressed.

Next, the setting of the voltage value "Vc" is explained. In a normal operation, the voltage value "Vc" is set within a range of the following expression.

$$2 \times n \times Vo \leq Vc \leq Vdss$$

Here, "Vo" is a voltage supplied to the load 13. "n" is a winding ratio between the secondary winding 3C and the primary winding 3A based on the number of windings of the secondary winding 3C as a standard. Note that the number of windings of the primary winding 3A is the same as the primary winding 3B. Thus, when the number of windings of the primary winding 3A is NA, when the number of windings of the primary winding 3B is NB, and when the number of windings of the secondary winding 3C is NC, these winding ratios are expressed as the following expression.

$$NA:NB:NC=n:n:1$$

Vdss is a maximum rated voltage between the source and the drain of the FETs 4 and 5. The reasons why the voltage value "Vc" is equal to or more than (2×n×Vo) are explained below. In the case in which the output voltage supplied to the load 13 is "Vo," when only one of the FETs 4 and 5 is turned on, a voltage that is approximately equal to the output voltage "Vo" is generated at both terminals of the secondary winding 3C. When only the FET 4 is turned on, a voltage of (n×Vo) is generated at both terminals of the primary winding 3A. When the voltage (n×Vo) is generated, the terminal (dotted terminal) of the primary winding 3A that is close to the primary winding 3B is at a higher potential. A voltage, which is the same as the voltage generated at both terminals of the primary winding 3A, is generated at both terminals of the primary winding 3B. The voltages generated at both terminals of both primary windings 3A and 3B have the same polarities. Therefore, the sum of those voltages, i.e., (2×n×Vo), is applied between the source and the drain of the FET 5. On the other hand, When only the FET 5 is turned on, a voltage of (n×Vo) is generated at both terminals of the primary winding 3B. When the voltage (n×Vo) is generated, the terminal (non-dotted terminal) of the primary winding 3B that is close to the primary winding 3A is at a higher potential. A voltage, which is the same as the voltage generated at both terminals of the primary winding 3B, is generated at both terminals of the primary winding 3A. The voltages generated at both terminals of both primary windings 3A and 3B have the same polarities. Therefore, the sum of those voltages, i.e., (2×n×Vo), is applied between the source and the drain of the FET 4.

When it is assumed that an instant surge voltage is not generated, the voltage (2×n×Vo) is applied between the sources and the drains of the FETs 4 and 5, respectively. In an actual circuit, a surge voltage is generated. Thus, when the surge voltage becomes stable, a voltage applied between a source and a drain (the voltage "Vs" shown in FIG. 3) corresponds to the voltage (2×n×Vo). In other words, the voltage (2×n×Vo) corresponds to a voltage in a normal condition (the voltage "Vs" shown in FIG. 3) that is applied to the source and the drain of the turned-off FETs 4 and 5. When the voltage value Vc is equal to or more than the voltage (2×n×Vo), the charging voltage of the capacitor 8 can be maintained as the voltage value Vc that is equal to or more than the voltage (2×n×Vo). Therefore, when the charging voltage of the capacitor 8 is maintained as the voltage value Vc, the capacitor 8 can be charged while an instant surge voltage (excess voltage) is applied with respect to the turned-off FETs 4 or 5.

Figure 4:
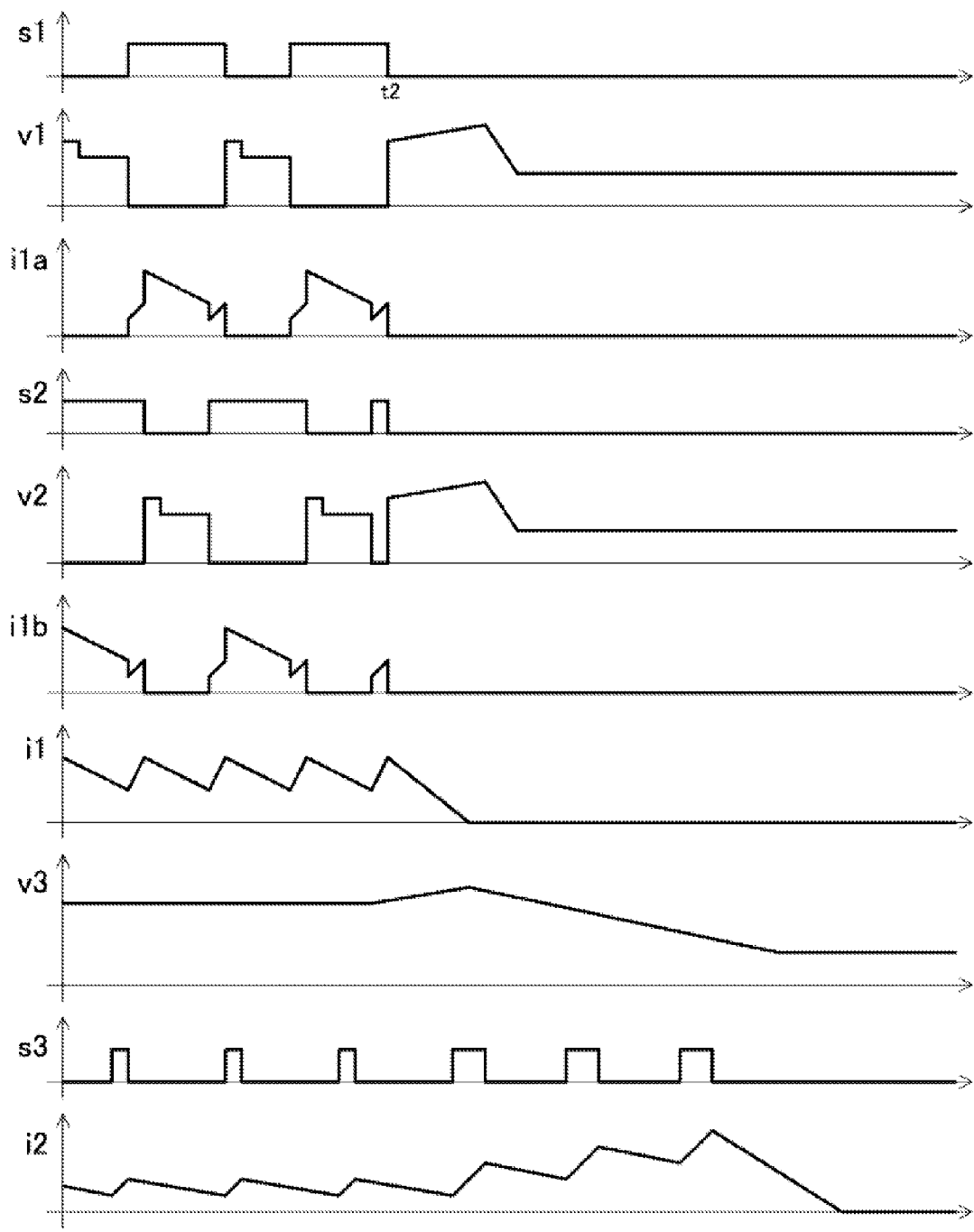
FIG. 4 is a waveform diagram of a voltage and an electric current when a current-fed isolation converter according to an embodiment of the invention stops an operation.

Next, the manner in which the DC-DC convertor stops its operation will be described. In FIG. 4, the DC-DC convertor stops its operation at time t2. In other words, the FETs 4 and 5 are turned off at time t2, and thereafter a switching operation stops. After the electric current "i1a" flowing in the FET 4 and the electric current "i1b" flowing in the FET 5 are zero ("0"), all the electric current "i2" flowing in the choke coil 2 becomes an electric current for charging the capacitor 8. As a result, the charging voltage "v3" of the capacitor 8 increases. In response to this situation, a duty ratio of the driving signal "s3" that is applied to the gate of the FET 22 increases by the regeneration control circuit 21. As a result, because a turning-on period of the FET 22 becomes longer, the rise of the charging voltage "v3" of the capacitor 8 is suppressed. When the electric current "i2" flowing in the choke coil 2 becomes zero ("0"), the charging voltage "v3" of the capacitor 8 is switched from risen to dropped. The regeneration control circuit 21 keeps supplying the driving signal "s3" until the charging voltage "v3" of the capacitor 8 is equal to the power supply voltage of the DC power source 1. The regeneration control circuit 21 stops supplying the driving signal "s3" when the charging voltage "v3" of the capacitor 8 is equal to the power supply voltage of the DC power source 1. In other words, when the charging voltage "v3" of the capacitor 8 is equal to the power supply voltage of the DC power source 1, the FET 22 stops a switching operation.

As discussed in the above embodiment, the current-fed isolation converter includes the choke coil 2 as a coil that is connected to the primary side of the transformer 3, the DC power source that supplies electric power to the primary side of the transformer 3, the FETs 4 and 5 as switching elements that control a first electric current flowing in the choke coil 2, the snubber circuit 15, and the regeneration circuit 9 as a step-down power supply circuit. The snubber circuit 15 includes the diodes 6 and 7 as rectifying elements and the capacitor 8 as a capacitive element. When one of the FETs 4 and 5 is turned off, the capacitor 8 is charged by a second electric current flowing in the corresponding diode 6 or 7. Thus, an excess voltage applied to both terminals, i.e., between the sources and the drains, of the FETs 4 and 5 is suppressed. The step-down power supply circuit regenerates electric charge of the capacitor 8 to the DC power source 1. The regeneration circuit 9 maintains the charging voltage of the capacitor 8 as a predetermined voltage value.

The current-fed isolation converter with the above configuration does not operate based on resonance. Thus, even though circuit elements that configure the snubber circuit 15 have variations of constant values, the snubber control circuit 21 stably performs. Therefore, a current-fed isolation converter including the regeneration-type snubber circuit 15, which stably performs and which has a simple circuit configuration or is implemented in a variety of ways, can be provided.

In this embodiment, a predetermined voltage value, which is maintained by the regeneration control circuit 21, is "Vx" (corresponding to the above "Vc"). When it is assumed that an instant surge voltage is not generated and when the FETs 4 and 5 are turned off, a voltage, which is applied between the sources and the drains of the FETs 4 and 5, respectively, is "Vy" (corresponding to the voltage "Vs" in FIG. 3). A maximum rated voltage between the sources and the drains of the FETs 4 and 5 is "Vz" (corresponding to the above Vdss). The predetermined voltage "Vx" is set under the condition that "Vx," "Vy," and "Vz" are satisfied with the following expression.

$$Vy \leq Vx \leq Vz$$

According to the above configuration, the capacitor 8 is charged during an occurrence of an instant surge voltage when the FETs 4 and 5 are turned off. As a result, a voltage applied to both terminals of the FETs 4 and 5 can be effectively controlled.

Further, in this embodiment, when the FETs 4 and 5 stop switching operations, the regeneration circuit 9 decreases the charging voltage of the capacitor 8 approximately to an output voltage of the DC power source 1. Thus, the rise of the voltage applied to the sources and drains of the FETs 4 and 5 can be surely prevented.

The current-fed isolation converter being thus described, it will be apparent that the same may not be limited to the above embodiments. Many variations can be possible and are not to be regarded as a departure from the spirit and scope of the invention.

Figure 5:
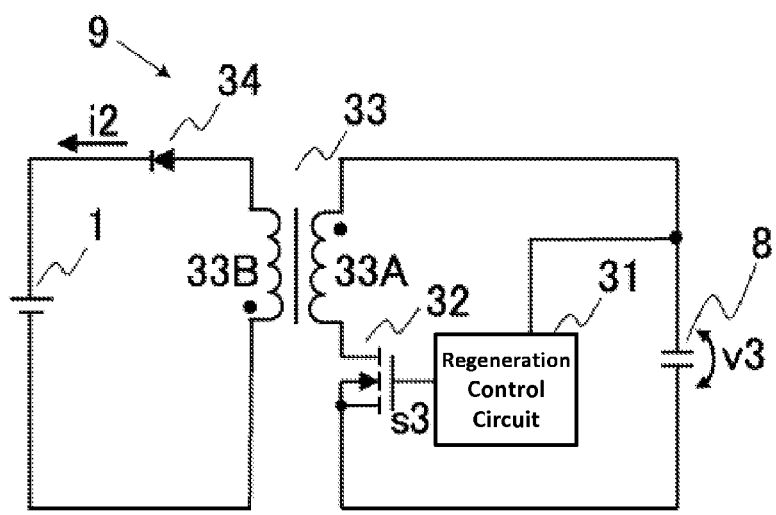
FIG. 5 is a schematic circuit diagram of a regeneration circuit according to another embodiment.

For example, the regeneration circuit 9 is not limited to the step-down chopper circuit. A step-down switching power supply circuit may be used as a regeneration circuit. FIG. 5 shows a flyback power supply circuit. In FIG. 5, an FET 32 is connected to a primary winding 33A of a transformer 33. A diode 34 is connected to a secondary winding 33B of the transformer 33. A switching operation of the FET 32 is controlled by a driving signal "s3" from a regeneration control circuit 31. The regeneration control circuit 31 performs pulse width modulation (PWM) control to maintain a charging voltage "v3" of the capacitor 8 as a predetermined value "Vc" by detecting the charging voltage "v3." In this case, when the FET 32 is turned on, the electric charge stored in the capacitor 8 is applied to the primary winding 33A. Then, because the diode 34 is turned off, energy is stored in the transformer 33. When the FET 32 is turned off, the diode is turned on. As a result, an electric current generated by the energy stored in the transformer 33 flows toward the DC power source 1 as a regeneration current "i2."

Figure 6:
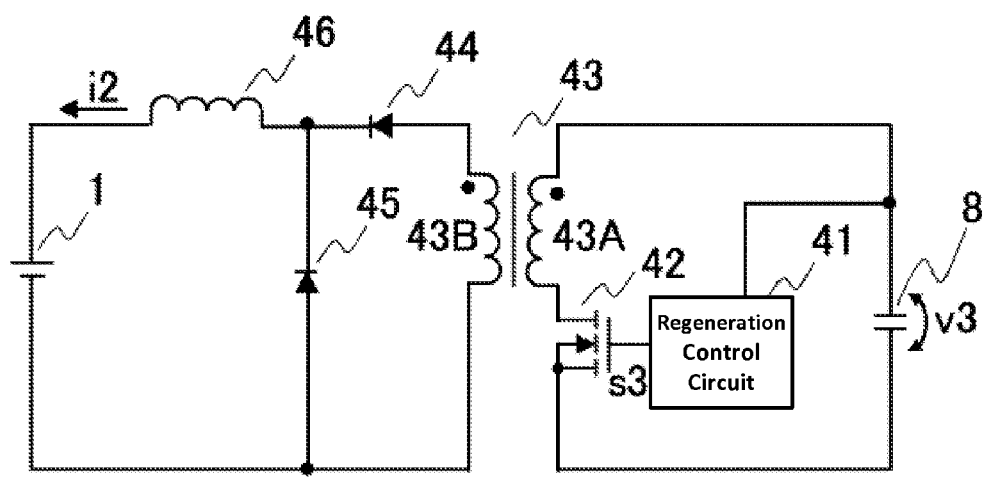
FIG. 6 is a schematic circuit diagram of a regeneration circuit according to yet another embodiment.

FIG. 6 is a forward power supply circuit. In FIG. 6, an FET 42 is connected to a primary winding 43A of a transformer 43. Diodes 44 and 45 are connected to a secondary winding 43B of the transformer 43. A choke coil 46 is connected to the cathodes of the diodes 44 and 45. A switching operation of the FET 42 is controlled by a driving signal "s3" from a regeneration control circuit 41. The regeneration control circuit 41 performs pulse width modulation (PWM) control to maintain a charging voltage "v3" of the capacitor 8 as a predetermined value "Vc" by detecting the charging voltage "v3." In this case, when the FET 42 is turned on, the electric charge stored in the capacitor 8 is applied to the primary winding 43A. Then, the diode 44 is turned off while the diode 45 is turned off. A regeneration current "i2" flows in the diode 44 and the choke coil 46 in this order toward the DC power source 1 from the secondary winding 43B. On the other hand, when the FET 42 is turned off, the diode 45 is turned on while the diode 44 is turned off. As a result, an electric current generated by the energy stored in the choke coil 46 flows toward the DC power source 1 as the regeneration current "i2."

Further, the regeneration circuit 9 may be switching power supply circuits that are capable of step-down operations, such as a single ended primary inductance converter (SEPIC) power supply circuit and a Zeta power supply circuit. In addition, a three-terminal regulator may be used as a regeneration circuit. When any of the above other power supply circuits are used as regeneration circuits, those regeneration circuits can maintain a stable voltage potential level between the sources and drains of the FETs 4 and 5 in the same manner of the regeneration circuit 9 as discussed in the above embodiments.

A primary side circuit of the transformer 3 is not limited to the push-pull circuit as shown in FIG. 1. A full bridge circuit shown in FIG. 7 may be used as a primary side circuit of a transformer. In the full bridge circuit of FIG. 7, four FETs 51-54 are used as a switching element instead of the FETs 4 and 5 shown in FIG. 1. The four FETs 51-54 are connected to a primary winding 50A of a transformer 50 by a bridge connection. When the pair of FETs 51 and 54 is turned on, the pair of FETs 52 and 53 is turned off. When the pair of FETs 51 and 54 is turned off, the pair of FETs 52 and 53 is turned on. A series circuit including a diode 56 and a capacitor 8 is connected to each terminal of a series circuit including the FETs 51 and 53 and a series circuit including the FETs 52 and 54.

When each of the pairs of FETs 51 and 54, and FETs 52 and 53 is turned off, the capacitor 8 is charged by an electric current for charging flowing in the diode 56. An excess voltage that is applied between sources and drains of the FETs 51-54 is suppressed by flowing of this electric current for charging. In the above embodiments, the regeneration control circuits 21, 31, 41 perform to maintain the charging voltage "Vc" of the capacitor 8 as a predetermined voltage "Vc'." "Vc'" is set within a range of the following expression.

$$n \times Vo \leq Vc' \leq Vdss$$

Here, "Vo" is a voltage supplied to a load 59 through a rectifying circuit 57 and a capacitor 58 from a secondary winding 50B of the transformer 50. "n" is a winding ratio between the secondary winding 50B and the primary winding 50A based on the number of windings of the secondary winding 50B as a standard. Thus, when the number of windings of the primary winding 50A is N1 and when the number of windings of the secondary winding 50B is N2, these winding ratios are expressed as the following expression.

$$N1:N2=n:1$$

Vdss is a maximum rated voltage between the source and the drain of the FETs 51-54.

Figure 7:
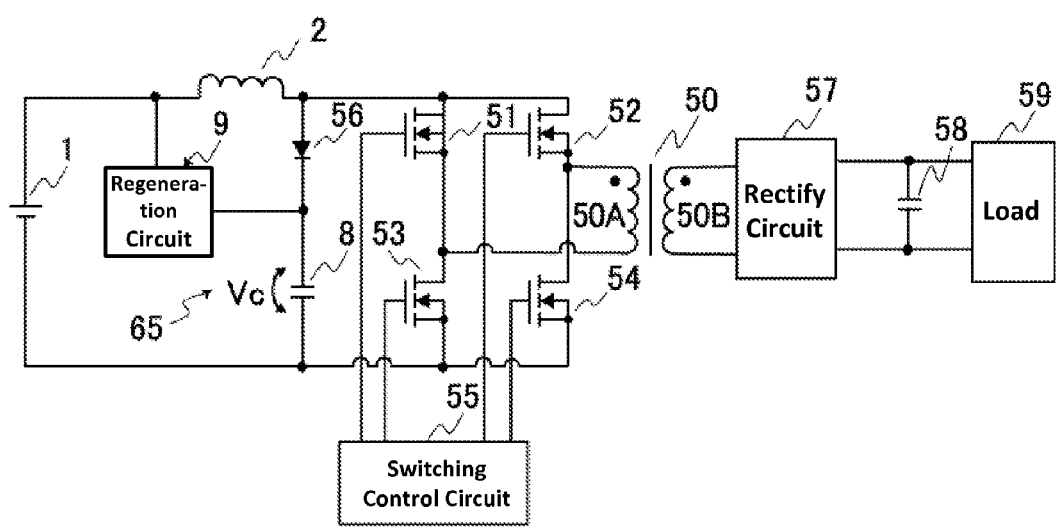
FIG. 7 is a circuit diagram of a current-fed isolation converter according to another embodiment of the present invention.

Because a regeneration circuit 9 shown in FIG. 7 can implement the same circuit configurations of FIGS. 2, 5 and 6, the regeneration circuit 9 can maintain a stable voltage potential level between the sources and drains of the FETs 51-54 in the same manner as discussed in the above embodiments.

The current-fed isolation converter shown in FIG. 1 can transmit electric power not only from a primary side circuit to a secondary side circuit of the transformer 3, but also from the secondary side circuit to the primary side circuit as a bidirectional converter. This can be done by exchanging the positions of the DC power source 1 and the load 13 and by performing a switching operation with a switching element (not shown) of the rectifying circuit 11. Thus, a switching circuit including the FETs 4 and 5 in the primary side circuit can also act as a rectifying circuit. When the switching circuit of the FETs 4 and 5 performs as a rectifying circuit, a circuit including the diode 6, the diode 7, the capacitor 8, and the regeneration circuit 9 also performs as the snubber circuit 15.

In other words, when the current-fed isolation converter shown in FIG. 1 is used as a bidirectional converter, the FETs 4 and 5, which are circuit elements configuring a rectifying circuit, rectify a voltage induced at the primary windings 3A and 3B. When the FETs 4 and 5 perform as the circuit elements configuring a rectifying circuit, the regeneration control circuit 21 controls a switching operation of the FET 22 provided in the regeneration circuit 9 in order to maintain a charging voltage of the capacitor 8 as a predetermined voltage. As a result, when electric power is transmitted between the primary side and the secondary side of the transformer 3 in both directions, a voltage between the sources and drains of the FETs 4 and 5 can be maintained at a stable voltage potential level.

Similarly, the full bridge current-fed isolation converter shown in FIG. 7 can perform as a bidirectional converter in which electric power is transmitted from the secondary side circuit to the primary side circuit of the transformer 50. This can be done by exchanging the positions of the DC power source 1 and the load 59 and by performing a switching operation with a switching element (not shown) of the rectifying circuit 57. In this case, a switching circuit including the FETs 51-54 in the primary side circuit can also perform as a rectifying circuit. When the switching circuit of the FETs 51-54 performs as a rectifying circuit, a circuit including the diode 56, the capacitor 8, and the regeneration circuit 9 also performs as a snubber circuit 65. As a result, when electric power is transmitted between the primary side and the secondary side of the transformer 50 in both directions, a voltage between the sources and drains of the FETs 51-54 can be maintained at a stable voltage potential level.

Further, a transistor can be used as a switching element instead of using the FETs 4, 5, and 51-54. In this case, a gate, a drain, and a source of an FET in the above embodiments correspond to a base, a collector, and an emitter of a transistor, respectively.

The current-fed isolation converter being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. A current-fed isolation converter, comprising:
   a coil that is connected to a primary side of a transformer;
   a power source that supplies electric power to the primary side of the transformer;
   a switching element that controls a first electric current flowing in the coil;
   a snubber circuit that includes a rectifying element and a capacitive element, the capacitive element being charged by a second electric current flowing in the rectifying device; and
   a step-down power supply circuit that regenerates electric charge of the capacitive element to the power source, the step-down power supply circuit includes:
      a regeneration switching element that is connected to the capacitive element;
      a regeneration control circuit that is connected to the capacitive element to detect the electric charge of the capacitive element and that provides a pulse width modulation drive signal to the regeneration switching element so as to perform a turn ON and OFF operation of the regeneration switching element; and
      an energy storage element that stores energy being attributed to the electric charge of the capacitive element, wherein
   the snubber circuit controls an excess voltage that is generated when the switching element is turned off,
   when the regeneration switching element is turned ON, the electric charge of the capacitive element is discharged, and when the regeneration switching element is turned OFF, a regeneration current is created based on the energy stored in the energy storage element, and
   when the regeneration control circuit detects that the electric charge of the capacitive element is more than a predetermined voltage value, the regeneration control circuit increases an ON period of the regeneration switching element by increasing a duty ratio of the pulse width modulation drive signal so that the step-down power supply circuit maintains a charging voltage of the capacitive element at the predetermined voltage value.

2. The current-fed isolation converter according to claim 1, wherein
   when the switching element stops a switching operation, the step-down power supply circuit decreases the charging voltage of the capacitive element approximately to an output voltage level of the power source by providing the pulse width modulation drive signal to the regeneration switching element so as to turn ON the regeneration switching element.

3. The current-fed isolation converter according to claim 1, wherein
   when the current-fed isolation converter is used as a bidirectional converter that transmits electric power between the primary side and a secondary side of the transformer in both directions, the switching element performs as a circuit element of a rectifying circuit, and
   when the switching element performs as the circuit element of the rectifying circuit, the step-down power supply circuit maintains the charging voltage of the capacitive element at the predetermined voltage value.

4. The current-fed isolation converter according to claim 1, wherein
   the predetermined voltage value is Vx and Vx satisfies the following equation:

$$Vy \leq Vx \leq Vz$$

here, Vy is a first voltage value that is applied to both terminals of the switching element when the switching element is turned off, and a surge voltage is removed from the first voltage value, and Vz is a second voltage value that corresponds to a maximum rated voltage between both terminals of the switching element.

5. The current-fed isolation converter according to claim 4, wherein
   when the current-fed isolation converter is used as a bidirectional converter that transmits electric power between the primary side and a secondary side of the transformer in both directions, the switching element performs as a circuit element of a rectifying circuit, and
   when the switching element performs as the circuit element of the rectifying circuit, the step-down power supply circuit maintains the charging voltage of the capacitive element at the predetermined voltage value.

6. The current-fed isolation converter according to claim 4, wherein
   when the switching element stops a switching operation, the step-down power supply circuit decreases the charging voltage of the capacitive element approximately to an output voltage of the power source by providing the pulse width modulation drive signal to the regeneration switching element so as to turn ON the regeneration switching element.

7. The current-fed isolation converter according to claim 6, wherein
when the current-fed isolation converter is used as a bidirectional converter that transmits electric power between the primary side and a secondary side of the transformer in both directions, the switching element performs as a circuit element of a rectifying circuit, and
when the switching element performs as the circuit element of the rectifying circuit, the step-down power supply circuit maintains the charging voltage of the capacitive element at the predetermined voltage value.

8. A current-fed isolation converter, comprising:
a coil that is connected to a primary side of a transformer;
a power source that supplies electric power to the primary side of the transformer;
a switching element that controls a first electric current flowing in the coil;
a snubber circuit that includes a rectifying element and a capacitive element, the capacitive element being charged by a second electric current flowing in the rectifying device; and
a step-down power supply circuit that regenerates electric charge of the capacitive element to the power source, the step-down power supply circuit includes:
   a regeneration switching element that is connected to the capacitive element;
   a regeneration control circuit that is connected to the capacitive element to detect the electric charge of the capacitive element and that provides a pulse width modulation drive signal to the regeneration switching element so as to perform a turn ON and OFF operation of the regeneration switching element; and
   an energy storage element that stores energy being attributed to the electric charge of the capacitive element, wherein
the snubber circuit controls an excess voltage that is generated when the switching element is turned off, and
when the regeneration control circuit detects that the electric charge of the capacitive element is more than a predetermined voltage value, the regeneration control circuit increases an ON period of the regeneration switching element by increasing a duty ratio of the pulse width modulation drive signal so that the step-down power supply circuit maintains a charging voltage of the capacitive element at the predetermined voltage value.

9. The current-fed isolation converter according to claim 8, wherein
when the switching element stops a switching operation, the step-down power supply circuit decreases the charging voltage of the capacitive element approximately to an output voltage level of the power source by providing the pulse width modulation drive signal to the regeneration switching element so as to turn ON the regeneration switching element.

10. The current-fed isolation converter according to claim 8, wherein
when the current-fed isolation converter is used as a bidirectional converter that transmits electric power between the primary side and a secondary side of the transformer in both directions, the switching element performs as a circuit element of a rectifying circuit, and
when the switching element performs as the circuit element of the rectifying circuit, the step-down power supply circuit maintains the charging voltage of the capacitive element at the predetermined voltage value.

11. The current-fed isolation converter according to claim 8, wherein
the predetermined voltage value is Vx and Vx satisfies the following equation:

$$Vy \leq Vx \leq Vz$$

here, Vy is a first voltage value that is applied to both terminals of the switching element when the switching element is turned off, and a surge voltage is removed from the first voltage value, and Vz is a second voltage value that corresponds to a maximum rated voltage between both terminals of the switching element.

12. The current-fed isolation converter according to claim 11, wherein
when the current-fed isolation converter is used as a bidirectional converter that transmits electric power between the primary side and a secondary side of the transformer in both directions, the switching element performs as a circuit element of a rectifying circuit, and
when the switching element performs as the circuit element of the rectifying circuit, the step-down power supply circuit maintains the charging voltage of the capacitive element at the predetermined voltage value.

13. The current-fed isolation converter according to claim 11, wherein
when the switching element stops a switching operation, the step-down power supply circuit decreases the charging voltage of the capacitive element approximately to an output voltage of the power source by providing the pulse width modulation drive signal to the regeneration switching element so as to turn ON the regeneration switching element.

14. The current-fed isolation converter according to claim 13, wherein
when the current-fed isolation converter is used as a bidirectional converter that transmits electric power between the primary side and a secondary side of the transformer in both directions, the switching element performs as a circuit element of a rectifying circuit, and
when the switching element performs as the circuit element of the rectifying circuit, the step-down power supply circuit maintains the charging voltage of the capacitive element at the predetermined voltage value.

* * * * *